United States Patent [19]
Galbiati et al.

[11] Patent Number: 5,731,670
[45] Date of Patent: Mar. 24, 1998

[54] METHOD FOR DRIVING A BRUSHLESS DC ELECTRIC MOTOR

[75] Inventors: Ezio Galbiati, Agnadello; Giuseppe Maiocchi, Villa Guardia, both of Italy

[73] Assignee: SGS-Thomson Microelectronics S.r.l., Agrate Brianza, Italy

[21] Appl. No.: 624,697

[22] Filed: Mar. 27, 1996

Related U.S. Application Data

[60] Provisional application No. 60/007,719, Nov. 30, 1995.

[30] Foreign Application Priority Data

Mar. 31, 1995 [EP] European Pat. Off. ............. 95830124

[51] Int. Cl.$^6$ ....................................................... H02P 7/00
[52] U.S. Cl. ............................................. 318/254; 318/439
[58] Field of Search ..................................... 318/254, 439, 318/138

[56] References Cited

U.S. PATENT DOCUMENTS

| | | | |
|---|---|---|---|
| 4,446,440 | 5/1984 | Bell | 330/10 |
| 4,527,102 | 7/1985 | Gotou | 318/254 |
| 4,624,537 | 11/1986 | Young | 318/254 |
| 4,633,150 | 12/1986 | Inaji et al. | 318/254 |
| 4,746,843 | 5/1988 | Taenzer | 318/138 |
| 4,987,352 | 1/1991 | Ishii | 318/254 |
| 5,017,845 | 5/1991 | Carobolante et al. | 318/138 |
| 5,172,036 | 12/1992 | Cameron | 318/138 |
| 5,173,645 | 12/1992 | Naito | 318/138 |
| 5,191,269 | 3/1993 | Carobolante | 318/254 |
| 5,196,771 | 3/1993 | Naito | 318/254 |
| 5,202,614 | 4/1993 | Peters et al. | 318/254 |
| 5,202,616 | 4/1993 | Peters et al. | 318/254 |
| 5,204,594 | 4/1993 | Carobolante | 318/254 |
| 5,221,881 | 6/1993 | Cameron | 318/254 |
| 5,231,338 | 7/1993 | Bulgarelli et al. | 318/254 |
| 5,233,275 | 8/1993 | Danino | 318/254 |
| 5,258,695 | 11/1993 | Utenick et al. | 318/138 |
| 5,258,696 | 11/1993 | Le | 318/254 |

(List continued on next page.)

FOREIGN PATENT DOCUMENTS

| | | |
|---|---|---|
| 0 584 855 | 3/1994 | European Pat. Off. . |
| 0 602 977 | 6/1994 | European Pat. Off. . |
| 416 1081 | 6/1992 | Japan . |

OTHER PUBLICATIONS

Application No. 08/764,782, filed Dec. 12, 1996, entitled "BEMF Crossing Detection in PWM Mode Operation for Sensorless Motor Control Application".

Antognini, L., and J. Paratte, "Self Synchronisation of PM Step and Brushless Motors; A New Sensorless Approach," *Actuator 90:Proc. of 2nd International Technology-Transfer Congress*, 1990, pp. 45–48.

Pouilloux, Dominique, "Full-Wave Sensorless Drive ICS for Brushless DC Motors," *Electronic Components and Applications*, vol. 10, No. 1, 1991, pp. 2–11.

Bahlmann, J. P. M., "A Full-Wave Motor Drive IC Based on the Back-EMF Sensing Principle," *IEEE Transactions on Consumer Electronics*, vol.35, No. 3, Aug. 1989, pp. 415–420.

Paraskeva, M. and M. J. Werson, "Microprocessor Control of a Brushless D.C. Motor," *Proceeding of the Conference on Drives/Motors/Controls 84*, 1984, pp. 80–82.

Mosley, J. D., "Spin Chips Whirl Into Nondrive Applications," *EDN-Technolgy*, vol. 37, No. 9, Apr. 23, 1992, pp. 43, 45, 46, and 48.

*Primary Examiner*—Jonathan Wysocki
*Attorney, Agent, or Firm*—David V. Carlson; Robert E. Mates; Seed and Berry LLP

[57] ABSTRACT

A circuit and method for driving a brushless sensorless direct current (DC) motor (2), using the steps of: at the beginning of each phase, driving the motor in PWM mode; monitoring the duration (Tc) between successive zero-crossings of the back electromotive force (BEMF), and accordingly predicting the next zero-crossing; and before the next predicted zero-crossing, switching to a linear driving mode only until the actual zero-crossing of the BEMF.

22 Claims, 5 Drawing Sheets

U.S. PATENT DOCUMENTS

| | | | |
|---|---|---|---|
| 5,289,097 | 2/1994 | Erickson et al. | 318/811 |
| 5,306,988 | 4/1994 | Carobolante et al. | 318/254 |
| 5,307,439 | 4/1994 | Enami | 388/811 |
| 5,309,078 | 5/1994 | Cameron | 318/811 |
| 5,319,289 | 6/1994 | Austin et al. | 318/254 |
| 5,331,259 | 7/1994 | Naito | 318/254 |
| 5,343,127 | 8/1994 | Maiocchi | 318/254 |
| 5,397,972 | 3/1995 | Maiocchi | 318/439 |
| 5,406,150 | 4/1995 | Austin | 318/599 |
| 5,455,885 | 10/1995 | Cameron | 388/834 |

METHOD FOR DRIVING A BRUSHLESS DC ELECTRIC MOTOR

CROSS-REFERENCE TO RELATED APPLICATION

This application claims priority from provisional application 60/007,719 filed Nov. 30, 1995 and from EPC application 95830124.4 filed Mar. 31, 1995, both of which are hereby incorporated by reference.

BACKGROUND AND SUMMARY OF THE INVENTION

This invention relates to a method of driving a brushless DC motor.

In particular, the invention relates to a method of driving a direct current motor of the brushless type by means of an electronic driver circuit effective to establish a first or a second mode of operation and comprising means of detecting a switching in the electromotive force.

The use of brushless dc motors is gaining increasing acceptance by reason of the small electric noise of such motors. These motors generally come equipped with position sensors which are utilized for electronically switching, via a driver circuit, the flow of current through the winding phases.

In other instances, it is possible to re-construct, by virtue of the electromagnetic forces induced by the rotation of the permanent magnet relative to the stator winding (BEMFs), the electric signals due to such forces, and to utilize the zero crossings of these signals (BEMF zero cross) to determine the rotor position. In this way, the switchings can be synchronized by means of such electric signals.

Motors of the last-mentioned type include no position sensors (sensorless motors). Such motors are commonly used in disk drives and other applications, and control of such motors has been an area of intense engineering effort. Additional background on such motors can be found, e.g., in Pouilloux, "Full-wave sensorless drive ICs for brushless DC motors," 10 ELECTRONIC COMPONENTS & APPLICATIONS 2 (1991); Antognini et al., "Self synchronisation of PM step and brushless motors; a new sensorless approach," in ACTUATOR 90: PROC. OF 2ND INTERNATIONAL TECHNOLOGY-TRANSFER CONGRESS at 44 (ed. K. Lenz 1990); Bahlmann, "A full-wave motor drive IC based on the back-EMF sensing principle," 35 IEEE TRANS'NS CONSUMER ELECTRONICS 415 (1989); Paraskeva et al., "Microprocessor control of a brushless DC motor," in PROCEEDINGS OF THE CONFERENCE ON DRIVES/MOTORS/CONTROLS 84 at 80 (1984); U.S. Pat. No. 5,343,127 of Maiocchi, "Start-up Procedure for a Brushless, Sensorless Motor;" U.S. Pat. No. 5,319,289 of Austin et al., "Adaptive Commutation Delay for Multi-pole Brushless DC Motors;" U.S. Pat. No. 5,202,616 of Peters et al., "Bipolar or Unipolar Drive Back-EMF Commutation Sensing Method;" U.S. Pat. No. 4,527,102 of Gotou, "Drive System for a DC Motor With Reduced Power Loss;" U.S. Pat. No. 4,633,150 of Inaji et al., "Driving Circuit For Brushless DC Motors;" U.S. Pat. No. 4,746,843 of Taenzer, "Motor Control Circuit and Drive Amplifier for a Permanent Magnet DC Torque Motor;" U.S. Pat. No. 4,987,352 of Ishii, "Brushless Motor Driver;" U.S. Pat. No. 5,017,845 of Carobolante et al., "Brushless Direct Current Motor Starting and Operating Apparatus and Method;" U.S. Pat. No. 5,172,036 of Cameron, "Method and Apparatus for Resynchronizing a Moving Rotor of a Polyphase DC Motor;" U.S. Pat. No. 5,173,645 of Naito, "Brushless Motor Drive Circuit;" U.S. Pat. No. 5,191,269 of Carbolante, "Brushless Direct Current Motor with Minimized Current Ripple and Method;" U.S. Pat. No. 5,196,771 of Naito, "Brushless Motor Drive Circuit;" U.S. Pat. No. 5,202,614 of Peters et al., "Self-Commutating, Back-EMF Sensing, Brushless DC Motor Controller;" U.S. Pat. No. 5,221,881 of Cameron, "Method and Apparatus for Operating Polyphase DC Motors;" U.S. Pat. No. 5,233,275 of Danino, "Simplified Sensorless DC Motor Commutation Control Circuit Using Analog Timing Techniques;" U.S. Pat. No. 5,258,695 of Utenick et al., "Spin Motor Control System for a Hard Disk Assembly;" U.S. Pat. No. 5,258,696 of Le, "IC Controller Chip For Brushless DC Motors;" U.S. Pat. No. 5,306,988 of Carobolante et al., "Method and Apparatus for Operating Polyphase DC Motors;" U.S. Pat. No. 5,331,259 of Naito, "Brushless Motor Drive Circuit;" U.S. Pat. No. 5,397,972 of Maiocchi, "Start-Up Procedure for a Brushless, Sensorless Motor;" U.S. Pat. No. 5,455,885 of Cameron, "Method and Apparatus for Starting a Sensorless Polyphase DC Motor in Dual-Coil Mode and Switching to Single Coil Mode at Speed;" L6238 and L6238S Data Sheets from SGS-Thomson Microelectronics, Inc.; D. Hanselman, BRUSHLESS PERMANENT-MAGNET MOTOR DESIGN (1994); and T. J. E. Miller, BRUSHLESS PERMANENT-MAGNET AND RELUCTANCE MOTOR DRIVES (2.ed. 1993); all of which, and the references cited in them, are hereby incorporated by reference.

These motors are usually driven by a LINEAR type of current control, using integrated power circuits wherein the output stage which powers the winding phases comprises a full-wave three-phase bridge circuit having at least six MOS power transistors.

The motor current is controlled in a LINEAR manner by a transconductance feedback loop.

The MOS power transistor associated with a given phase and functioning as a current source is brought to full conduction, i.e. to its saturation range of operation. The MOS drain transistor associated with that phase functions instead as a transconductance element.

For low-power applications, such as with hard disk readers intended for computers having at most one or two disks driven by sensorless brushless motors which have smaller acceleration currents than 1.5 A and smaller steady-state currents than 300 mA, the aforementioned transconductance loop provides one of the best solutions.

However, for high-power applications, such as with hard disk readers intended for computers having more than two disks driven by sensorless brushless motors which require larger acceleration currents than 3 A and larger steady-state currents than 500 mA, the previously described transconductance loop shows to be inadequate both in terms of power dissipation and power drain.

In order to reduce power consumption in high-power applications, certain methods have been proposed as discussed herein below.

A first solution provides enhanced power handling capability for the output stage of the integrated circuit through the use of a single, P-channel external MOS transistor of a discrete type.

In that way, the output stage of the IC would be operated at cutoff or saturation, with the transconductance power loop control function being performed by the discrete external component. An inherent disadvantage of this solution is, of course, that an expensive discrete component is additionally required.

A second technical solution provides PWM control of the motor current amplitude at the stages of motor stamp or acceleration; it being a well recognized fact that the power dissipation through the output stage of the integrated circuit mostly occurs at the motor startup or acceleration stages.

Thus, this technique proposes switching the motor current control from a PWM (Pulse Width Modulation) mode during the startup and acceleration stages to a LINEAR mode upon the rotor attaining a predetermined nominal speed.

In this way, a large amount, perhaps as much as 50%, of the power normally dissipated at startup or during the acceleration stage can be saved.

This is an efficient solution with systems which require small control currents for the motor torque at rated speed; the control being provided by the LINEAR transconductance loop.

A third solution is available which is mainly adopted where comparatively large currents are needed to control the motor torque at rated speed. In this case, the motor current would be controlled in the PWM mode both at startup and while running at rated speed to keep the internal power dissipation low and reduce power consumption.

To appreciate the disadvantages of this solution, the BEMFs (Back ElectroMotive Forces) should be considered. As the electric generated signals corresponding to such electromotive forces cross a line of zero level, a BEMF zero cross condition is met.

This crossing of the zero level line identifies a precise position of the rotor relative to the stator. The best phase-switching position can be obtained from this information in terms of minimum torque ripple. The time lapse between successive zero crossings is called the switching period, Tc.

An inherent disadvantage of the third solution just described is that the detection of the induced electromotive force zero crossing (BEMF zero cross) must be enabled well apart from the current switchings produced by the PWM mode control, if noise induced by these switchings is not to yield false zero-crossing readings. In this way, however, the passages through the zero-level line may be detected at locations other than the real ones, resulting in the motor phases being switched at less than optimum positions in terms of minimum output torque ripple.

The underlying technical problem of this invention is to avoid detecting zero crossings at different positions from the real ones, while retaining the advantages of a current control in the PWM mode.

The present application discloses novel circuits and techniques for providing PWM control, at the startup or acceleration stages, by switching to linear control a suitably calculated time ahead of a zero crossing to be detected.

This time is advantageously calculated as a fraction of the switching period Tc immediately preceding it.

After detecting a switch in the electromotive force, the mode is restored to PWM.

The features and advantages of the method according to the invention will be apparent from the following detailed description of an embodiment thereof, given by way of non-limitative example with reference to the accompanying drawings.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

Figure 3:
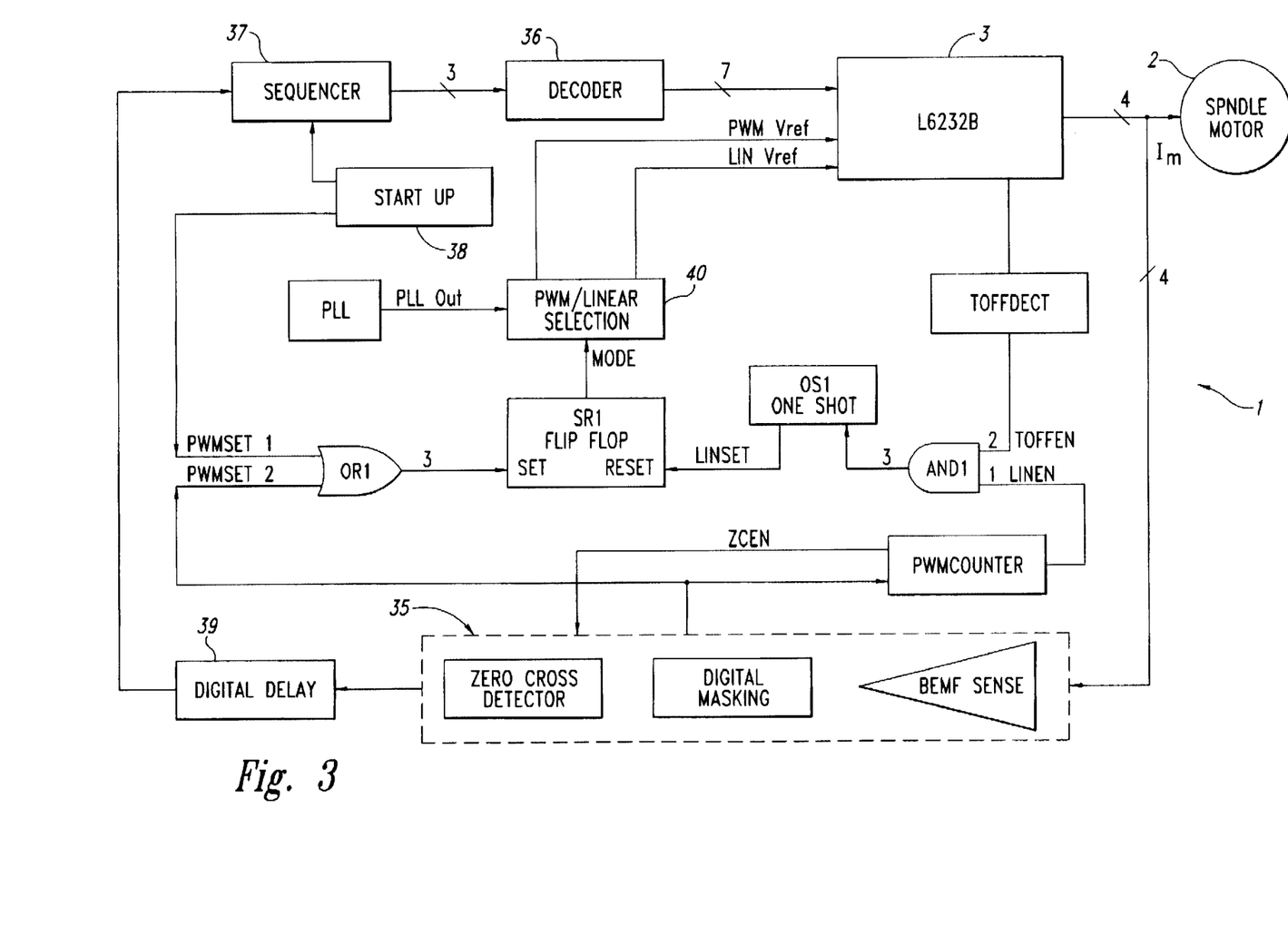
FIG. 3 is a schematic of the driver circuit including the power stage of FIG. 1.

The numerous innovative teachings of the present application will be described with particular reference to the presently preferred embodiment (by way of example, and not of limitation), in which:

Referring to the drawings, and specifically to the example of FIG. 3, generally and schematically shown at 1 therein is a driver circuit for a DC motor 2 of the so-called brushless type.

The circuit 1 comprises a power output stage 3 of the monolithically integrated type and having a plurality of output terminals, each connected to a respective phase of the motor 2.

The internal construction of the stage 3 is shown in greater detail in FIG. 1, and no detailed description of it will be given herein, in view of an integrated circuit identified as part L6232B manufactured by this Applicant and a covering handbook being available. This chip and its data sheet are both hereby incorporated by reference.

The stage 3 has three output terminals A, B and C connected downstream from corresponding half-bridge driver circuits which comprise MOS power transistors.

The stage 3 includes all of circuitry needed to drive the motor 2 in either the PWM (Pulse Width Modulation) and LINEAR modes.

The switching between these two modes is established by the lower of two input voltage values, PWM-Vref and LIN-Vref, applied to respective input terminals 17 and 18 of the stage 3.

These voltages are generated on respective outputs of a selector 40 which is input two discrete signals, PLLOUT and MODE. The first input signal is output from a block PLL, and the second input signal is output from a flip-flop type of storage element SR1 having set and reset inputs.

Figure 2:
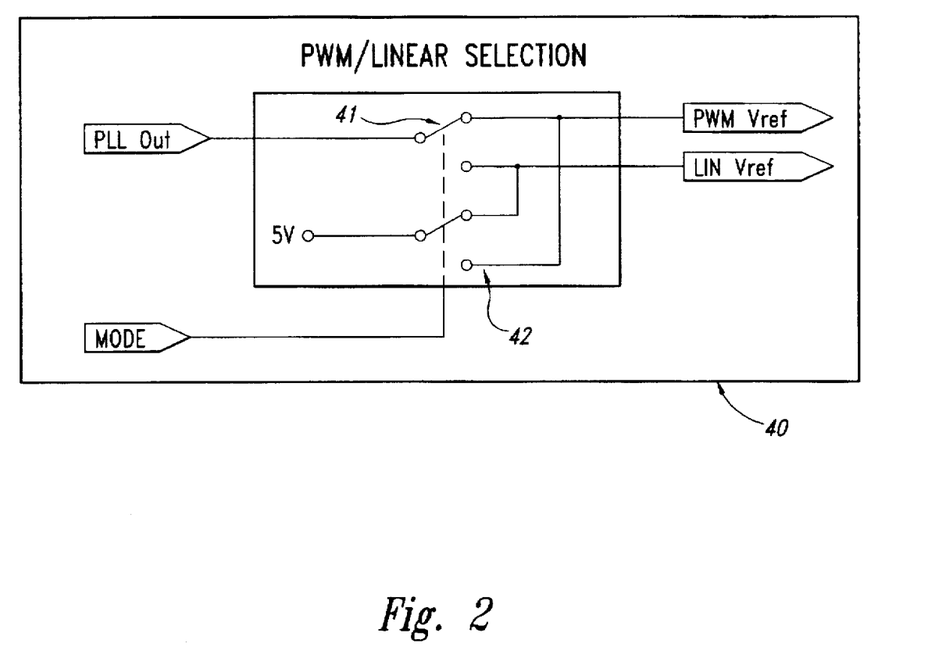
FIG. 2 is a schematic of a circuit block included in said driver circuit and being connected to inputs of the stage shown in FIG. 1, the block being connected to generate switch signals for switching between two different driving modes.

Shown in FIG. 2 is the internal construction of the selector 40, which comprises basically a pair of electronic switches 41 and 42 being connected to each other and both controlled to close by the signal MODE.

Coming back to the stage 3, it can be seen that the voltage at the inputs 17 and 18 produces an error signal which is used internally to regulate a current Im for supply to the motor 2.

In both the PWM and LINEAR modes, the current Im is expressed by the following:

$$Im = Vref/(Gv*Rs)$$

where: Vref is a control voltage output from a block PLL of the circuit 1; Gv is the voltage gain of a sense amplifier 45 of the stage 3; and Rs is the value of an external resistive sensor connected to output terminals 5 and 9 of the stage 3.

Figure 1:
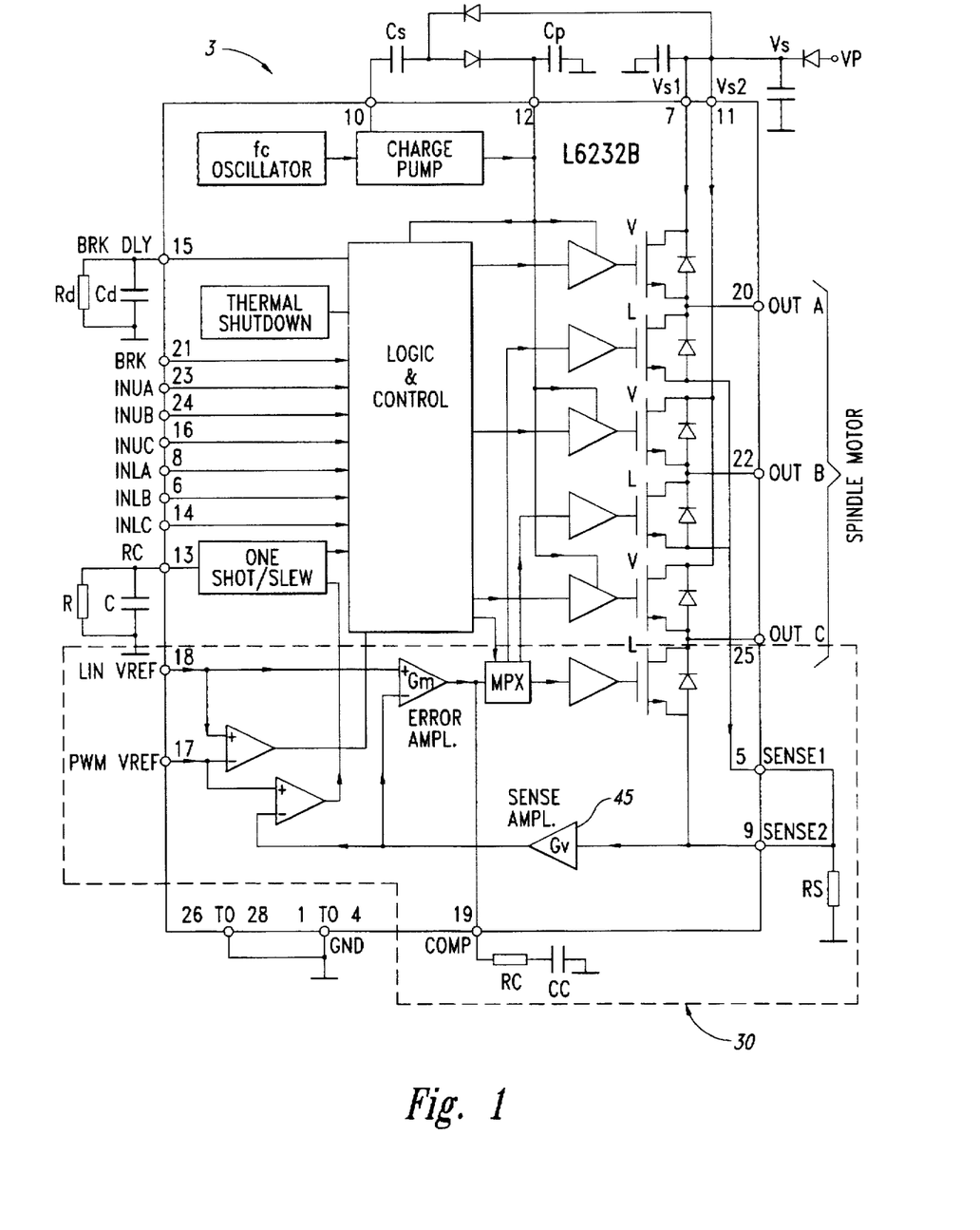
FIG. 1 is a block diagram representation of a power output stage in a driver circuit for a brushless electric motor.

In the LINEAR mode, the current Im is regulated by a transconductance loop, generally shown at 30, which drives MOS power transistors, denoted by L in FIG. 1, via a multiplexer MPX.

On the other hand, in the PWM mode, as the current Im attains a predetermined value, MOS power transistors denoted by U in FIG. 1 are turned off for a time period Toff. A detecting circuit TOFFDECT, connected to the stage 3, conveniently determines the off state of such transistors U.

The output from this detector TOFFDECT is applied, through a logic gate AND1, to a pulse generator OS1 which is connected upstream of the storage element SR1 of the flip-flop type.

Specifically, the output of the generator OS1 is connected to the reset input of the storage element SR1, which receives on its set input a signal from a second logic gate OR1 having two inputs respectively connected to an output of a starting circuit (START UP) 38 and to an output of a detecting circuit 35 to be described.

This output from the detecting circuit 35 is also applied to a counter PWMCOUNTER whose output is connected to the second input of the first logic gate AND1.

A second output of the circuit 35 is connected to a delay block 39 connected serially to a sequencer 37 which is connected, in turn, serially to a decoder 36 whose outputs are applied to the power stage 3.

The detecting circuit 35 is connected directly to the outputs of the stage 3, namely the same outputs from which the motor 2 is driven, and comprises, in series, an electromotive force sensor BEMF SENSE, a digital filter DIGITAL MASKING, and a further detector ZERO CROSS DETECTOR for detecting zero crossings by the electromotive force BEMF.

The method of this invention is primarily dependent on determining the switching time Tc between two successive zero crossings by the corresponding signal to the electromotive force BEMF.

U.S. Pat. No. 5,231,338, which is hereby incorporated by reference, discloses a method of measuring the time Tc which can be used to also determine the time length of a so-called masking period required to filter the signals BEMF after a phase switching and to detect the actual location of the signal BEMF zero crossing.

With the switching period Tc between two previous crossings measured by a counter being known, the arrangement described in the above patent can predict with great accuracy the time of the next crossing of the zero line.

This also applies to the startup stage, when with the motor still at a slow acceleration, two successive values of Tc are bound to differ little from each other. All of the subsequent steps of detecting the actual position of zero crossing would be synchronized to the period Tc.

The method of this invention uses a similar principle to that disclosed in the above patent. In particular, this method distinguishes itself by that the change from the PWM mode over to the LINEAR mode is effected in a synchronized manner to the time period Tc.

Referring in particular to FIG. 3 and the graphs in FIG. 4, the method of this invention will now be described in greater detail.

The PWM driving mode is set at the motor 2 startup, when a startup procedure would be carried out by the block START UP 38.

Throughout the discussion to follow, PWMTIME will denote the time period when the PWM mode is enabled. During this period the switching from the PWM mode to the LINEAR mode is enabled.

T_ZC_MASK is the masking period, during which the electromotive force switching detector 35 (BEMF zero cross detector) is disabled to mask off the switching noise during the change from the PWM mode to the LINEAR mode.

PER1 is the percent fraction of the period Tc when the PWM mode is enabled but the switching from the PWM mode to the LINEAR has not yet been enabled. This a value which can be programmed by the user.

PER2 is the percent fraction of the period Tc when the electromotive force switch detector 35 (BEMF zero cross detector) is disabled. This is also a value which can be programmed by the user.

Now, the period Tc of the last switching of the startup procedure can be measured as described, for example, in U.S. Pat. No. 5,231,338, and the following values can be obtained based on this:

PWMTIME=PER1*Tc

T_ZC_MASK=PER2*Tc.

Figure 4:
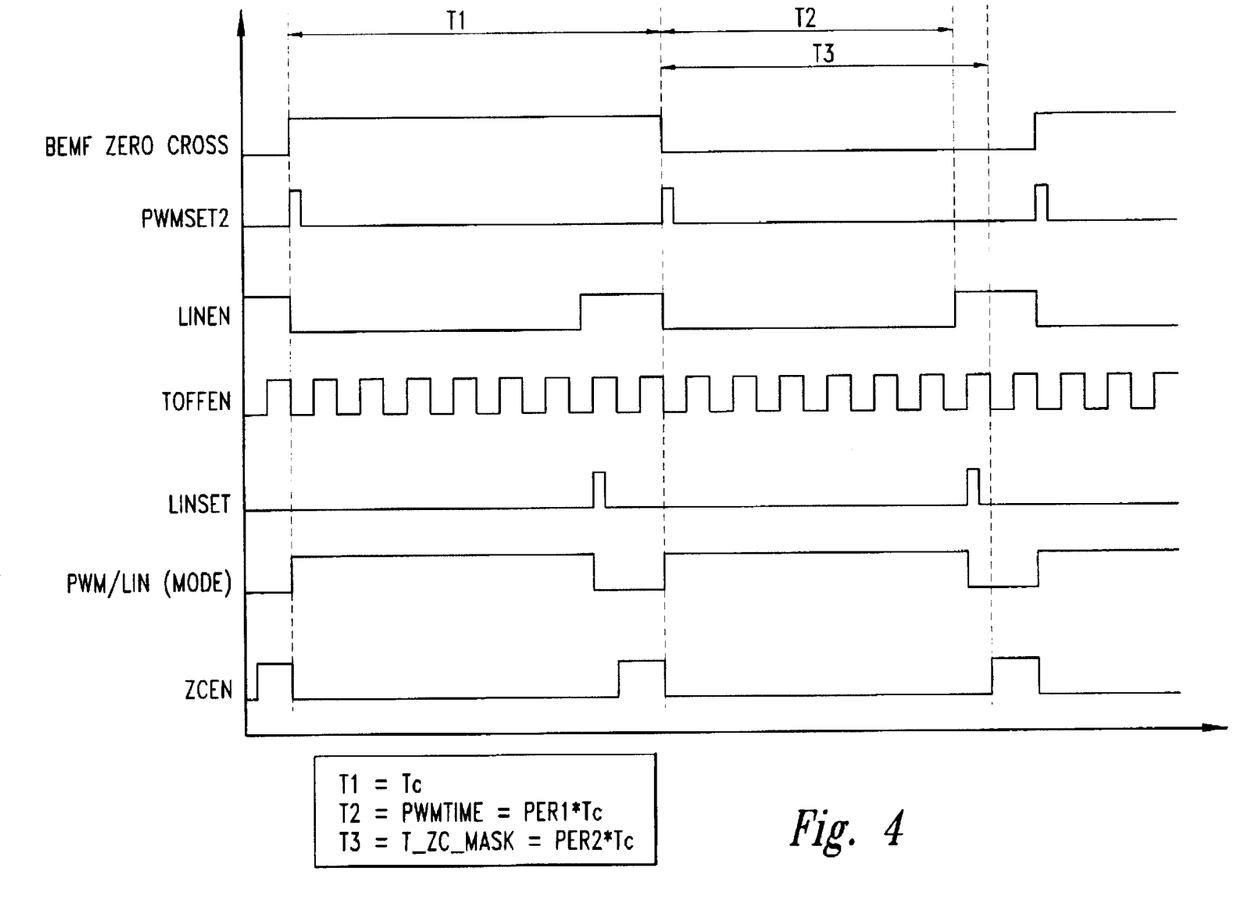
FIG. 4 shows a set of graphs, plotted against the same time base, of signals present in the circuit of FIG. 3.
Figure 5:
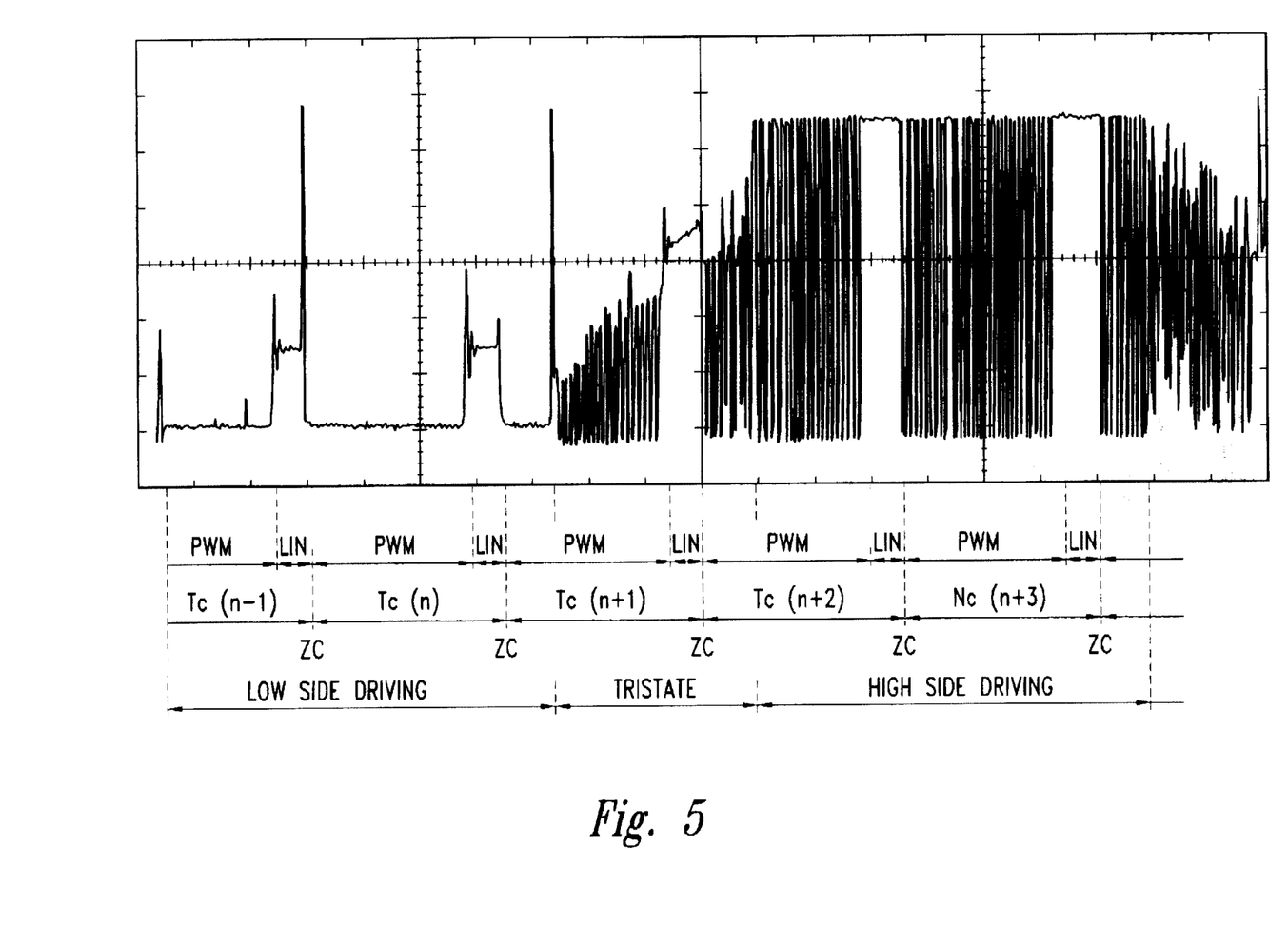
FIG. 5 illustrates the pattern vs. time of a voltage signal present at an output terminal of the stage in FIG. 1.

In FIG. 4, the period Tc is denoted by T1, and the periods PWMTIME and T_ZC_MASK are denoted by T2 and T3, respectively.

On the time period PWMTIME having elapsed, the PWM mode to LINEAR mode switching is enabled. This switching is set by the leading edge of a signal TOFFEN output from the detector TOFFDECT and whose pattern is shown in FIG. 4.

On expiration of the time period T_ZC_MASK, on the other hand, the electromotive force zero crossing detector 35 (BEMF zero cross detector) is enabled.

At the very time when a switching occurs through the zero line and a new period Tc commenced, the values PWMTIME and T_ZC_MASK are re-calculated and the PWM mode is enabled once again.

The startup block sets the PWM mode by means of a pulse PWMSET1 which is applied to the storage element SR1 via a second logic gate OR1.

The PWM mode is set immediately after each switching of the electromotive force across the zero line by supplying a second signal PWMSET2 to the storage element SR1, again via the second logic gate OR1.

Meanwhile, the counter PWMCOUNTER, as pre-loaded with the value PER" obtained from the preceding switching time Tc, initiates a counting step.

Upon the counter reaching the value PWMTIME, the LINEAR mode is set, bringing the signal LINEN to a logic high.

In addition, as the signal TOFFEN is also brought to a logic high, the logic gate AND1 enables the block OS1 to reset, by a signal LINSET, the storage element SR1 and complete the switch to the LINEAR mode.

Upon the counter PWMCOUNTER reaching the value T_ZC_MASK, the switching detector 35 is enabled by a signal ZCEN.

The time period PER1*Tc can also be defined when the change from the PWM mode to the LINEAR mode is yet to be enabled; while the value (PER2-PER1)*Tc is the time required to mask off the switching noise in the transition between the two modes of operation.

As soon as a new switching of the electromotive force BEMF is detected, the PWM mode is set again on the set input of the storage element SR1 by means of the signal PWMSET2. The counter PWMCOUNTER is reset and the count cycle repeated.

The signal TOFFEN only synchronizes the PWM to LINEAR mode switching during the off period Toff, that is as the current is flowing again, thereby providing a reduced current transient.

The method of this invention does solve the technical problem, and affords a number of advantages first among which is undoubtedly the fact that the motor 2 is operated in the PWM mode for most of the time, with reduced power drain and reduced power dissipation.

Switching to the LINEAR mode only occurs for a predetermined short time before the electromotive force BEMF is switched over. The actual point of zero crossing during the electromotive force switching is detected accurately, thereby improving the system performance in terms of accuracy and consistency of the motor rotational speed.

Also, no special circuits are required to mask the electromotive force switching detector during switchings brought about by the motor current control in the PWM mode.

According to a disclosed class of innovative embodiments, there is provided: A method for driving a brushless sensorless direct current motor, comprising the steps of: starting the motor; and running the motor while monitoring back EMF generated by the motor; wherein said running step (b.) comprises the substeps of monitoring the durations between successive zero-crossings of said back EMF; using said duration monitoring step (i) to calculate a next predicted zero-crossing of said back EMF; at or before said next predicted zero-crossing of said back EMF, beginning to continually drive the motor using linear control of one or more of a plurality of power transistors; and upon the actual occurrence of a zero-crossing of said back EMF which corresponds to said next predicted zero-crossing of said back EMF, beginning to continually drive the motor using pulse-modulated control of one or more of said plurality of power transistors.

According to another disclosed class of innovative embodiments, there is provided: A method for operating a brushless DC motor having a plurality of coil terminals, comprising the steps of: driving ones of said coil terminals, to commute current to sequentially drive multiple phases of motor operation; wherein said step (a.), for each respective phase of said driving step, first applies a pulse-modulated drive waveform to a respective one of said coil terminals, and, after a transition instant during said respective phase, thereafter applies linear-modulated drive waveform to said respective one of said coil terminals for the remainder of said respective phase; repeatedly sensing back EMF on whichever one of said terminals is momentarily undriven; monitoring the duration between successive zero-crossings of said back EMF, and calculating therefrom a next predicted zero-crossing of said back EMF, and accordingly defining said transition instant to precede said next predicted zero-crossing of said back EMF; and controlling the timing of said phases of said driving step in dependence on said sensing step. I. The method of claim 6, wherein the motor has exactly three said coil terminals. II. The method of claim 6, wherein said step (a) sequentially drives exactly six said phases of motor operation. III. The method of claim 6, wherein said transition instant is defined by a fixed fraction of the duration from a previous zero-crossing of said back EMF to said next predicted zero-crossing of said back EMF.

According to another disclosed class of innovative embodiments, there is provided: A method for operating a brushless DC motor having a plurality of coil terminals, comprising the steps of: driving ones of said coil terminals, to commute current to sequentially drive multiple phases of motor operation; wherein said step (a.), for each respective phase of said driving step, first applies a pulse-modulated drive waveform to a respective one of said coil terminals, and, after a transition instant during said respective phase, thereafter applies linear-modulated drive waveform to said respective one of said coil terminals for the remainder of said respective phase; repeatedly sensing back EMF on whichever one of said terminals is momentarily undriven; and controlling the timing of said phases of said driving step in dependence on said sensing step.

According to another disclosed class of innovative embodiments, there is provided: A method of driving a direct current motor of the brushless type by means of an electronic driver circuit effective to establish a first or a second mode of operation and comprising means of detecting a switching in the electromotive force, characterized in that it comprises the steps of: —starting the motor driving in the first mode; —detecting the time period between two successive switchings of the electromotive force; —switching the driving step to the second mode strictly for the time required to detect the actual switching of the electromotive force; —switching again the driving mode back to the first mode.

According to another disclosed class of innovative embodiments, there is provided: An integrated circuit driver for operating a brushless sensorless DC motor having a plurality of coil terminals, comprising: a zero-crossing detector which is operatively connected to detect, during successive ones of the rotational phases of the motor, zero-crossings of back EMF on a respective one of said coil terminals which is momentarily floating; a pulse-modulation drive circuit, which is connected to selectably provide a pulse-modulated drive waveform, in dependence on the phase of motor rotation, to a respective one of said coil terminals; a linear-modulation drive circuit, which is connected to selectably provide a linear-modulated drive waveform, in dependence on the phase of motor rotation, to a respective one of said coil terminals; and a switchover circuit, which is connected to activate said pulse-modulation drive circuit at the beginning of each phase of the motor, and, after a transition instant during said respective phase, to thereafter activate said linear-modulation drive circuit; and a sequencer which is operatively connected to receive a signal derived from said zero-crossing detector, and accordingly to control sequencing of said pulse-modulated drive waveform and of said linear-modulated drive waveform.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. For example, as will be obvious to those of ordinary skill in the art, other circuit elements can be added to, or substituted into, the specific circuit topologies shown.

What is claimed is:

1. A method for driving a brushless sensorless direct current motor, comprising the steps of:

(a.) starting the motor;

(b.) running the motor while monitoring a back EMF signal having successive zero-crossings generated by the motor;

(c.) monitoring a duration between each successive zero-crossing of said back EMF signal;

(d.) calculating a next zero-crossing of said back EMF signal based on the durations between preceding zero-crossings;

(e.) driving the motor using a linear control of one or more of a plurality of power transistors at or before said calculated next zero-crossing; and (f.) driving the motor using a pulse width modulated control of one or more of said plurality of power transistors after an occurrence of a zero-crossing corresponding to said calculated next zero-crossing.

2. The method of claim 1 wherein the step of driving the motor using a pulse width modulated control comprises the step of driving the motor using a pulse width modulated control of one or more of six power transistors.

3. The method of claim 1 wherein the step of calculating a next zero-crossing comprises the step of calculating a next zero-crossing of said back EMF sisal based on the duration between two immediately preceding zero-crossings.

4. The method of claim 1 wherein said step of running the motor further comprises the step of driving current into each of six phases of the motor in a sequence.

5. The method of claim 1, further comprising the steps of:
 driving the motor using the pulse width modulated control immediately after a zero-crossing for a period of time based on a selected fraction of the duration between two immediately preceding zero-crossings; and
 driving the motor using the linear control subsequent to the period of time until the occurrence of a zero-crossing corresponding to said calculated next zero-crossing.

6. A method for operating a brushless DC motor having a plurality of phases comprising the steps of:
 (a.) providing current to each of the phases for a first period of time, each of the phases receiving the current in a sequence;
 (b.) for each phase provided with the current:
  providing the current to the phase based on a pulse width modulated drive waveform for a second period of time before a transition instant;
  providing the current to the phase based on a linear drive waveform after the transition instant;
 (c.) sensing a back EMF signal having successive zero-crossings in a phase which is not receiving the current;
 (d.) monitoring a duration between each successive zero-crossing of said back EMF signal, and calculating therefrom a next zero-crossing of said back EMF signal, and selecting said transition instant to precede said calculated next zero-crossing of said back EMF signal; and
 (e.) selecting the first period of time based on a duration between two preceding zero-crossings.

7. The method of claim 6 wherein the step of providing current comprises the step of providing current to each of six phases for the first period of time in the sequence.

8. The method of claim 6 wherein said step of selecting the first period of time comprises the step of selecting the first period of time based on the duration between two immediately preceding zero-crossings.

9. The method of claim 6, further comprising the step of selecting the second period of time based on a fraction of the duration between two immediately preceding zero-crossings.

10. A method for operating a brushless DC motor having a plurality of phases comprising the steps of:
 (a.) providing current to each of the phases for a first period of time, each of the phases receiving the current in a sequence;
 (b.) for each phase provided with the current:
  providing the current to the phase based on a pulse width modulated drive waveform for a second period of time before a transition instant;
  providing the current to the phase based on a linear drive waveform after the transition instant;
 (c.) sensing a back EMF signal having successive zero-crossings in a phase which is not receiving the current; and
 (d.) selecting the first period of time based on the sensed successive zero-crossings.

11. The method of claim 10, further comprising the steps of:
 determining a time interval between two immediately preceding zero-crossings;
 wherein the step of selecting the first period of time comprises the step of selecting the first period of time based on the time interval.

12. The method of claim 10 wherein said step of providing current comprises the step of providing current to each of six phases in the sequence.

13. The method of claim 10, further comprising the step of selecting the second period of time based on a fraction of the first period of time.

14. A method of driving a direct current motor of the brushless type by means of an electronic driver circuit structured to control the motor in a first mode of operation or a second mode of operation and including circuitry for detecting switching in an electromotive force generated by the motor, the method comprising the steps of:
 driving the motor in the first mode of operation for a first interval;
 detecting a time period between two successive switchings of the electromotive force;
 driving the motor in the second mode of operation for a second interval required to detect a switching of the electromotive force; and
 driving the motor in the first mode of operation after the switching of the electromotive force is detected.

15. A method according to claim 14, further comprising the step of calculating the first interval in which the motor is driven in the first mode of operation between successive switchings of the electromotive force as a fraction of a time period between two preceding switchings of the electromotive force.

16. A method according to claim 14, further comprising the step of preventing a detection of the switching of the electromotive force for a third interval which is selected as a fraction of a time period between two preceding switchings of the electromotive force.

17. A method according to claim 14, wherein the step of driving the motor in the second mode of operation, further comprises the step of halting the driving of the motor in the first mode of operation during an off period of the first mode of operation.

18. A method according to claim 14, wherein the step of driving the motor in the first mode of operation after a switching of the electromotive force is detected comprises the step of driving the motor in the first mode of operation immediately after a switching of the electromotive force is detected.

19. An integrated circuit driver for operating a brushless sensorless DC motor having a plurality of phases receiving current to drive the motor to rotate, the integrated circuit driver comprising:
 a zero-crossing detector operatively connected to detect, during successive intervals of rotation of the motor, zero-crossings of a back EMF signal in a phase of the motor;
 a pulse width modulation drive circuit coupled to selectably provide a pulse width modulated drive waveform, in dependence on the interval of rotation of the motor, to a respective one of said phases;

a linear drive circuit coupled to selectably provide a linear drive waveform, in dependence on the interval of rotation of the motor, to a respective one of said phases;

a switchover circuit coupled to activate said pulse width modulation drive circuit at a beginning of each interval of rotation of the motor, and, after a transition instant during said interval of rotation, to thereafter activate said linear drive circuit; and a sequencer operatively coupled to receive a signal derived from said zero-crossing detector, and accordingly to control a sequencing of said pulse width modulated drive waveform and said linear drive waveform.

20. The integrated circuit driver of claim 19, further comprising a power transistor.

21. The integrated circuit driver of claim 19, further comprising a power transistor and a DC motor coupled in series with the power transistor.

22. The integrated circuit driver of claim 19, further comprising a power transistor, a DC motor, and a sense resistor coupled in series with the power transistor, said sense resistor having a resistance of less than one ohm.

* * * * *